Oct. 2, 1956
T. WILL
2,765,194
CONTAINER FOR SOLID OR LIQUID
INSECTICIDE, DEODORANT, OR
THE LIKE
Filed May 20, 1955
3 Sheets-Sheet 1
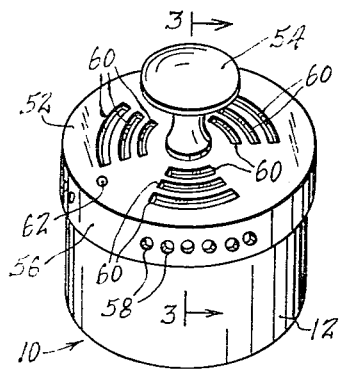
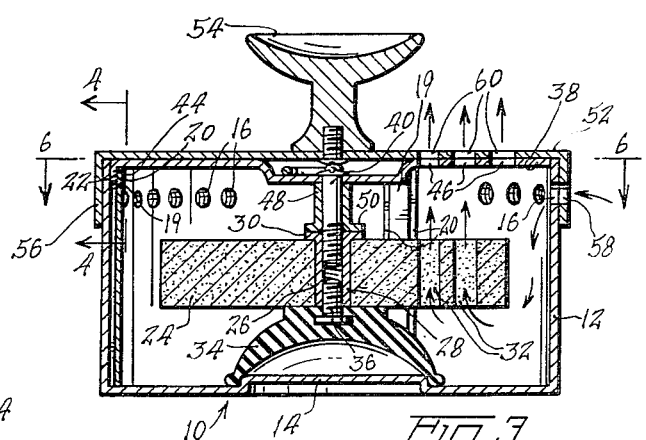
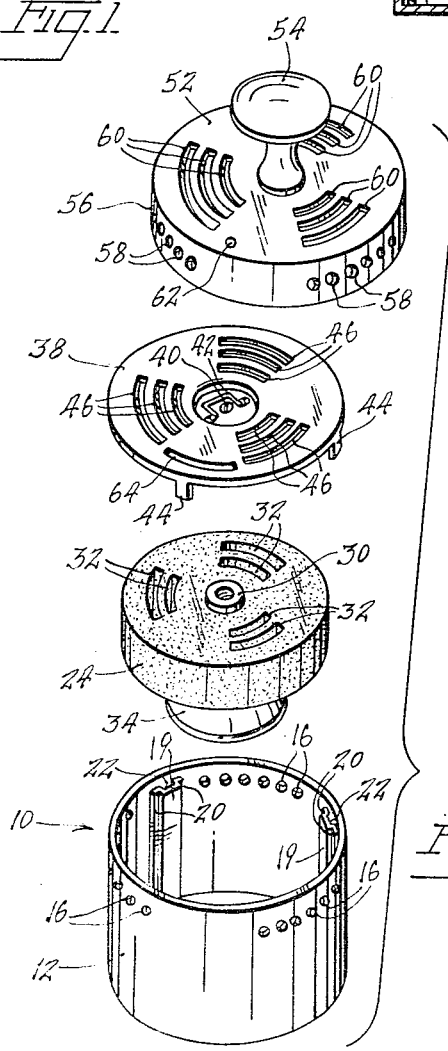
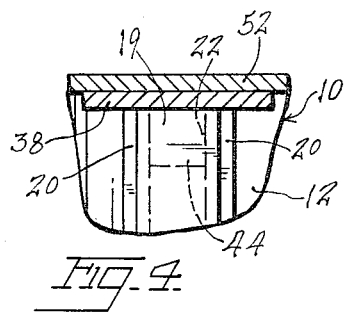
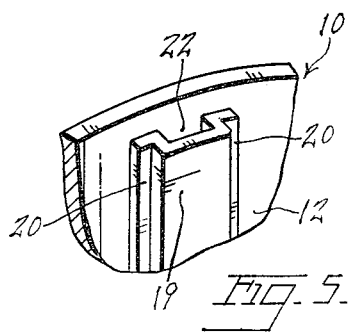
INVENTOR.
THEODORE WILL
BY
Zoltan G. Holochek
ATTORNEY Oct. 2, 1956
T. WILL
2,765,194
CONTAINER FOR SOLID OR LIQUID
INSECTICIDE, DEODORANT, OR
THE LIKE
Filed May 20, 1955
3 Sheets-Sheet 2
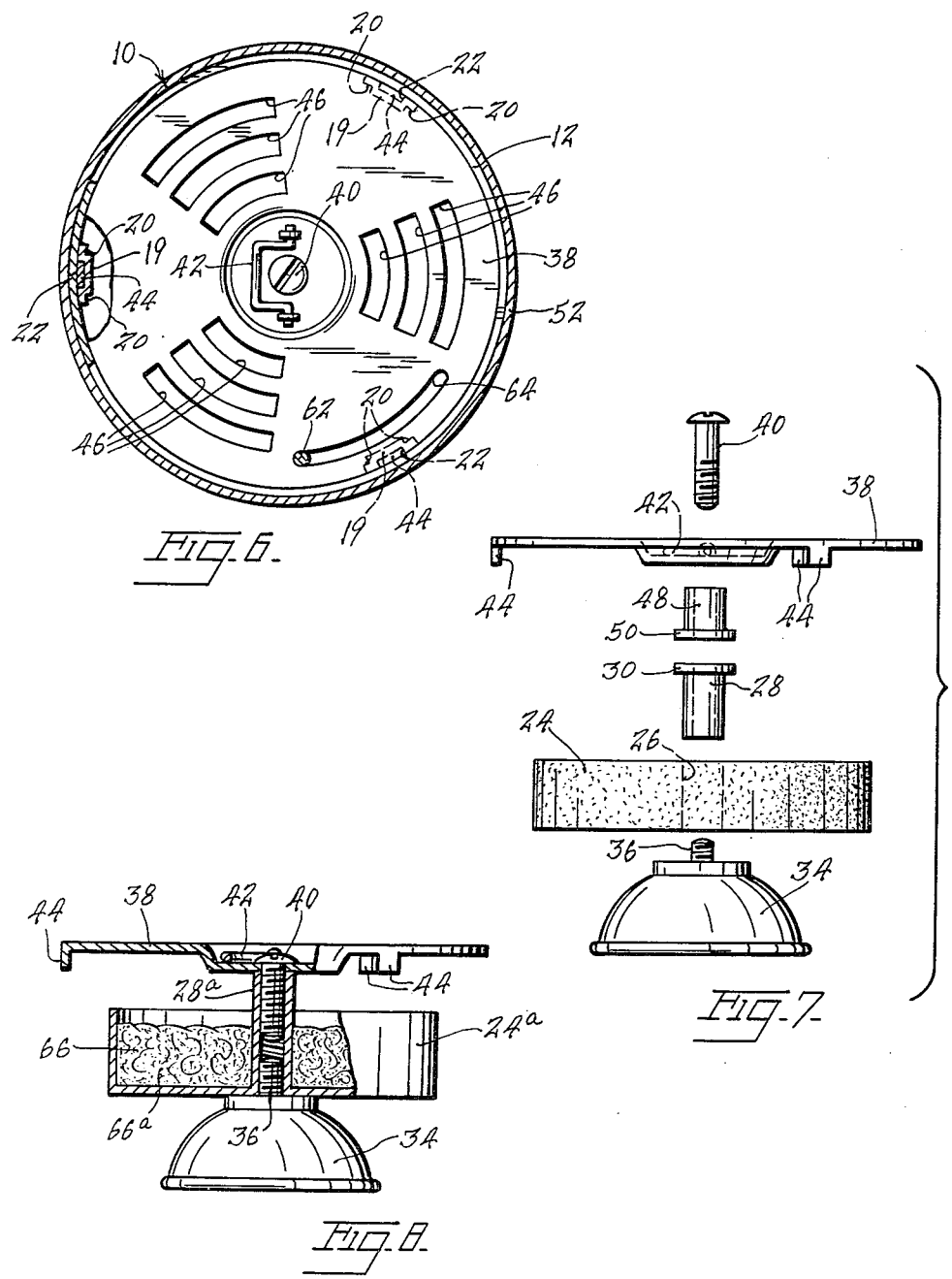
INVENTOR
THEODORE WILL
BY
Zoltan P. Holechek
ATTORNEY

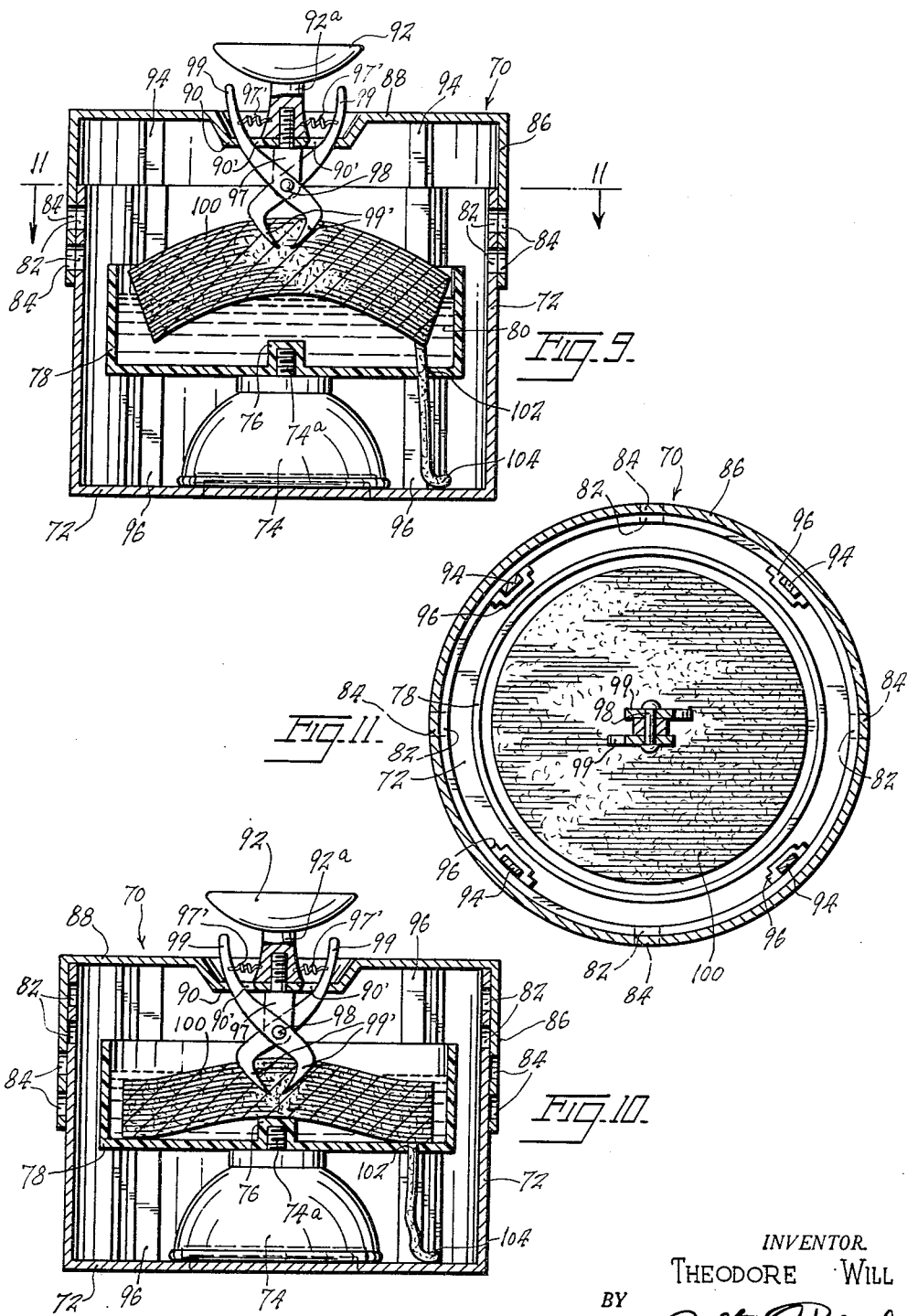

United States Patent Office 2,765,194
Patented Oct. 2, 1956

2,765,194

CONTAINER FOR SOLID OR LIQUID INSECTICIDE, DEODORANT, OR THE LIKE

Theodore Will, Syosset, N. Y., assignor to Fund-Del Inc., Syosset, N. Y., a corporation of New York Application May 20, 1955, Serial No. 509,849

11 Claims. (Cl. 299—24)

This invention relates to a holder adapted to contain solid or liquid substances used as insecticides, deodorants, etc., under conditions in which an aroma will be given off in the area surrounding the holder, which aroma, if an insect repellent or insecticide is confined within the holder will repel or kill insects in said area, or which, if a deodorizing substance is being used, will eliminate or reduce to an inconsequential amount unpleasant odors in said area.

One important object of the present invention is to provide a holder as described which will be attractive in appearance and inconspicuous, so as to permit the holder to be kept upon the shelf of a bathroom, kitchen, or other enclosure, where said holder can function to repel insects or eliminate undesirable odors, depending upon the substance confined therein.

Another object of importance is to provide a holder as described which, by a slight rotatable movement imparted to a cover thereof, can be completely closed to prevent the aroma from passing through apertures provided in said cover, or alternatively, can be opened partially or fully, to a selected, adjusted extent, to permit the aroma arising from the confined substance to be dispersed freely within the area surrounding the device.

A further object of importance is to permit replacement or replenishing of the aromatic means whenever desired, with a minimum of difficulty.

Still another object is to cause the aromatic material, whether liquid or solid, to be properly centered and held in its centered position, within the device, through the medium of a stationary, removable inner lid having a detachable, fixed connection to the means supporting the material within the associated container therefor.

Still another object is to so form the device as to cause the aromatic material to be elevated above the bottom of the associated container, and spaced inwardly from the walls of said container, so as to cause a maximum amount of the surface of said substance to be exposed to air flowing through the container and impinging upon the substance.

Yet another object is to so form the container, inner lid and cover as to provide, whenever the cover is adjusted to an operative position, apertures both in the side of the holder and in the top thereof, which apertures will promote a flow of air through the device, to insure maximum dispersal of the aroma emitted from the confined substance.

Still another object is to provide means for separably but fixedly interengaging the receptacle, inner lid, and support means for the aromatic substances, so as to hold these parts against relative movement, thus to insure proper operation of the device whenever the main or outer cover is adjusted to its operative, aperture-exposing position and to insure, further, against relative looseness, or rattling of the interengaged parts.

Yet another object, in another form of the invention, is to provide a holder as stated wherein there is a receptacle for a liquid deodorant, insecticide, or the like, having a wick disposed therein adapted to be raised for exposure to the air by a hook secured to a cover for the holder, the cover, when raised to elevate the wick, moving into a position in which openings formed therein register with openings formed in a container in which the receptacle is disposed, thus to cause the odor emanating from the liquid to be dispersed through a room whenever the cover is raised.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a container for insecticides or deodorants, formed according to one form of the present invention.

Fig. 2 is an exploded perspective view thereof.

Fig. 3 is an enlarged sectional view taken diametrically through the device, substantially on line 3—3 of Fig. 1.

Fig. 4 is a detail sectional view, still further enlarged, on line 4—4 of Fig. 3, showing the means for interengaging the receptacle and the inner lid against relative movement.

Fig. 5 is an enlarged, fragmentary perspective view of the receptacle showing the inside-lid-engaging means thereof.

Fig. 6 is a plan sectional view on line 6—6 of Fig. 3.

Fig. 7 is an exploded view in side elevation of the inside lid, aroma-producing substance, and the support means for said substance.

Fig. 8 is a view partly in side elevation and partly in vertical section of the inside lid, and means for holding the aroma-producing substance, showing a modified construction.

Fig. 9 is a view similar to Fig. 3 showing another modification, with the cover raised.

Fig. 10 is a view similar to Fig. 9 showing the cover lowered.

Fig. 11 is a cross-sectional view on line 11—11 of Fig. 9.

The reference numeral 10 has been generally applied to a device formed according to the present invention. At this point, it should be noted that the device can be used for confining any of various substances, whether solid or liquid, from which an aroma, odor, or fumes will be emitted by impingement of air against said substance. Mainly, a deodorant or disinfectant would be confined within the device, but an insect repellent or insecticide can be used as well. Hereinafter, the device will be referred to as a deodorizer, but it will be understood that it can be used for any of the other purposes mentioned herein.

The deodorizer constituting the present invention includes a cylindrical receptacle 12, closed at its bottom and formed open at its upper end. The bottom of the receptacle has a low, circular, boss 14 formed centrally on the bottom thereof (Fig. 3), and adjacent the top edge of the receptacle, circumferentially extending, spaced rows of openings 16 are formed. In the illustrated example, there are three rows of openings, all lying in a common plane paralleling that of the bottom of the receptacle, with the space between each pair of adjacent rows being left imperforate and being slightly greater in width than the length of each row.

Uniformly spaced about and adjacent the top of the receptacle 12 and disposed in alternating relation to the several rows 16 of openings are separate metal sleeve elements 19, each sleeve element extending from the top to the bottom of the receptacle and being fastened to the inner surface of the receptacle in spaced relation by welding or soldering the bent side edges 20 thereof to the receptacle so as to provide an interlocking slot or recess 22 therebehind.

In the form of the invention shown in Figs. 1–7, a flat, circular cake 24, formed of an aromatic, deodorizing substance, is used. This has a diameter substantially less than the inner diameter of the receptacle 12 as shown in Fig. 3, and formed centrally in the cake is an opening 26 communicating between the upper and lower surfaces thereof to receive a removable, internally threaded sleeve 28 the upper end of which is formed with an outwardly directed flange 30 engaging against the top surface of the cake 24.

The cake 24 is supported in an elevated position above the bottom of the receptacle by means of a rubber suction cup 34. The suction cup, at its lower, flared end, is of a diameter slightly greater than the diameter of the boss 14, so that the boss is used for centering the suction cup, and hence the cake 24, within the receptacle 12.

Embedded in the upper end of the suction cup, and projecting thereabove, is a threaded stud 36, engageable with the threads of the sleeve 28, and it will be understood that when the stud is threaded into the lower end of the sleeve to its maximum extent, the flange 30 of the sleeve will be caused to bear tightly against the top surface of the cake, while the rubber suction cup will be forced against the underside of the cake, thus to fixedly but separably assemble the cake, suction cup, and sleeve.

An inner lid 38 is formed of a flat, circular piece of sheet metal material or the like, and has a depressed center portion or boss centrally formed with an opening receiving an elongated connecting screw 40 threadable into the upper end of the sleeve 28. Within the indentation defined in the upper surface of the inside lid by the formation of the depressed center part, there is provided a U-shaped bail or handle 42, the opposite ends of which are projected outwardly and are rotatably engaged in upwardly struck sleeve portions of the center portion, thus to pivotally mount the handle upon the inside lid. Normally, the handle lies flat within the mentioned indentation, but whenever the lid is to be removed for the purpose of removing the cake, the handle 42 can be swung upwardly and grasped.

Uniformly spaced about the circumference of the inside lid are short, depending elongated tongues 44 adapted to fit snugly within the interlocking recesses 22 of receptacle 12 so as to guide the lid to its seat and prevent relative rotation of the lid and receptacle. The periphery of the lid, when the lugs are so engaged in the recesses, engages against the inner surface of the receptacle 12 at the upper end of the receptacle, so that the top edge of the receptacle and the upper surface of the inside lid are coplanar.

Formed in the inside lid (see Figs. 2 and 6) are circumferentially spaced series of slots or apertures 46. The slots are of arcuate formation, and are concentric with the lid, each series of slots including a plurality of slots spaced radially of the lid as shown in Fig. 6, said slots decreasing in length in a direction radially, inwardly of the lid so as to dispose corresponding, adjacent ends of the slots of each series in line with a line drawn radially of the lid.

A spacer sleeve 48 is adapted to receive the shank of screw 40, and at its lower end has an outwardly directed, circumferential lip 50 bearing against the flange 30 of sleeve 28 in the assembled condition of the parts.

It will be seen from the above that the cake 24, suction cup, and lid can be separably but fixedly secured together, by extension of screw 40 through the lid and spacer sleeve 48, for threading in the upper end of sleeve 28, and by threading of the stud 36 in the lower end of the sleeve 28.

A main or outer cover or lid 52 overlies the inside lid, and secured to and extending upwardly from the center of the cover 52 is a handle or knob 54, used for rotating the cover as well as for lifting the same off the receptacle. Cover 52 has a depending, circumferential flange 56 adapted to engage against the outer surface of the receptacle 12, and formed in the flange 56 are circumferentially spaced rows of openings 58 adapted to be brought into registration with the openings 16, on rotation of cover 52 to an operative position for causing the aroma emitted from cake 24 to be dispersed through the surrounding area.

As previously mentioned, the spaces between the rows of openings 16 of the receptacle are slightly greater in width than the length of any row, and accordingly, this is true also of the cover 52. Therefore, the cover 52, when rotated away from said operative position thereof, locates the openings 58 over the imperforate spaces between the rows of openings 16 of the receptacle 12, so as to cause the openings 58 as well as the openings 16 to be closed.

In the flat, circular body portion of the cover 52 there are formed circumferentially spaced series of slots or apertures 60 corresponding to the slots 46. When the openings 58 and 16 are in registration, the slots 60 and 46 are also in registration. As a result, and as shown in Fig. 3, air may flow inwardly through the registering openings 16, 58, so as to impinge against the cake 24. The cake 24, preferably, has circumferentially spaced series of arcuate slots 32, through which the air can flow to increase the area of the cake that is exposed to impingement of the air thereagainst. The air, accordingly, impinging upon the outer surfaces of the cake 24 and passing through the slots 32 of said cake, passes outwardly through the registering slots 46, 60 of the inside and outside covers 38, 52 respectively, to cause the aroma emitted by the cake to be dispersed into the room area surrounding the deodorizing device.

To limit rotatable movement of the outer cover in opposite directions, there is provided upon said cover a depending lug 62, engaging in an arcuate slot 64 formed in inside lid 38 adjacent the margin thereof, as shown in Figs. 2 and 6.

In Fig. 8 there is shown a slightly modified form, in which, instead of a cake 24, there is utilized a liquid deodorizing substance 66. The substance 66 may be impregnated in a suitable absorbent material 66$^a$, such as a wick, and is supported within a flat, circular, upwardly opening cup 24$^a$ of plastic material or the like, integrally formed centrally thereof with an elongated, vertically disposed sleeve 28$^a$ one end of which opens through the bottom of the cup 24$^a$ and the other end of which projects a substantial distance above the top edge of the liquid-holding portion of the cup and is also formed open. The sleeve 28$^a$ is threaded, so that the stud 36 can be threaded into the lower end thereof, while the screw 40 is threadable into the upper end of the sleeve, thus to fixedly but separably connect to the cup 24$^a$ the suction cup 34 and the inside lid.

Instead of a suction cup, the cup 24$^a$ can be provided with depending, circumferentially spaced legs resting upon the bottom of the receptacle 12. This is considered to be capable of being readily understood by one working in the art, and hence it is not thought necessary to provide a separate illustration of this possible construction.

In both forms of the invention and assuming that the parts are in the separated condition thereof shown in Fig. 2, as a first step the cake 24 or cup 24$^a$ is attached by means of the suction cup 34 to the bottom of the receptacle. Then, the inside lid is positioned upon the upper end of the receptacle 12, with its lugs 44 engaged in recesses 22. The screw 40 is now threaded into the sleeve 28 or 28$^a$ as the case may be, and this fixedly locks the lid 38 to the receptacle 12, in a predetermined position relative to the openings 16, the lid being locked in such manner as to prevent it from rattling, and to prevent, also, its removal until such time as the screw 40 is removed for the purpose of replacing cake 24 or replenishing the supply of liquid deodorant 66. It will be understood that when the cake 24 is used, of course, the sleeve 48 would first be positioned upon the flange 30 before the inside lid is applied to the receptacle 12.

Thereafter, the removable, rotatable main cover 52 is applied to the receptacle, with its lug 62 seating in slot 64. If, now, the cover 52 is rotated to dispose lug 62 at one end of slot 64, this being the left-hand end of the slot as seen in Fig. 6, the several slots 46, 60 and the openings 16, 58 will all be registered with one another, to permit the flow of air through the device so that said air can impinge upon the surface of cake 24 or liquid 66 and be charged with a deodorizing aroma.

At such time as it is desired to prevent an aroma from being dispelled through the registering slots and openings, the cover 52 is rotated to dispose its lug 62 at the other end of slot 64, and now the container will be completely sealed against the inflow and outflow of air.

It will be understood that any suitable material can be employed in forming the receptacle and lids, as well as cup 24ª, such as plastic, sheet metal, or the like.

In the form of the invention shown in Figs. 9–11, an open-topped, cylindrical container 72 is provided. Connectable to the bottom of the container 72 is a suction cup 74 having an upstanding stud 74ª threaded in a downwardly opening, threaded recess formed in a center boss 76 formed centrally in the bottom of an upwardly opening, cylindrical receptacle 78 for a liquid deodorant, insecticide, or similar odor-producing liquid 80.

Spaced ninety degrees apart about the circumference of container 72, adjacent the upper end of the container, are openings 82. At each location of the openings, a pair of openings 82 is provided in the illustrated example, with the openings of the pair being vertically aligned. It will be understood that the number and spacing of the openings can be varied as desired.

Openings 82 are adapted to register with openings 84 (Fig. 9) formed in the depending circumferential flange 86 of a cover 88 having a depressed center portion 90 in which is secured the shank 92ª of a handle 92. On both sides of the handle, the depressed portion is formed with slots 90'. Guiding the cover in its up and down movements between the positions of Figs. 9 and 10 are elongated tongues 94 depending from and spaced circumferentially about the cover (Fig. 11), the tongues being spaced inwardly from the flange 86 a short distance and being slidably engaged in sleeve elements 96 welded or otherwise fixedly secured to the inner surface of the container 72. The tongues and sleeves are of a length corresponding to the height of the container, to increase the area of the sleeves that the tongues bear against. The tongues frictionally bind within the sleeve to an extent sufficient to hold the cover in its elevated position.

Fixedly secured to the handle 92 and depending downwardly into the center of the receptacle 78 is a bracket 97 and pivotally supported on the bracket by means of a pivot pin 98 are the lever arms 99 of a tong device. The inner ends of the lever arms are formed with hooks 99' urged toward each other by springs 97' interposed between the shank 92ª of the handle and the outer ends of the lever arms, outwardly of the depressed portion 90. The hooked ends 99' of the tong device are adapted to bite into a wick 100 and support the wick suspended in liquid 80 in the receptacle 78. The wick is in coiled formation.

In the bottom of receptacle 78, adjacent the periphery thereof, there is formed an opening 102 which is slightly smaller in diameter than the normal diameter of the wick, so as to cause the portion of the wick, which is extended through the opening 102, to be tightly engaged in the opening. The portion of the wick below the receptacle has been designated at 104, and extends fully to the bottom of the container.

The purpose of this arrangement is to cause the wick to absorb any liquid which may accidentally spill onto the bottom of the container 72. In such an event, the end portion 104, being immersed in the spilled liquid, will absorb the same and hasten evaporation thereof.

As shown in Fig. 10, when the cover is lowered, the wick is wholly immersed in the liquid, so that evaporation of the liquid is minimized. At the same time, when the cover is lowered, the openings 84 thereof are offset from the openings 82 in the container, thus to seal the container against the admission of air.

When, however, the cover is raised to permit use of the device, the tong device is carried out of the liquid, raising the hook supported portions of the wick, thus to provide an evaporation surface, the liquid traveling into the elevated parts of the wick and evaporating in air passing through the device, said air passing in and out of the device through the now registered openings 82, 84.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A holder for deodorants and like substances comprising a receptacle, means therein for supporting a deodorizing or like substance, an inner lid having a plurality of apertures, said inner lid being removably supported on said receptacle, and an outer lid rotatably supported upon said receptacle and overlying said inner lid, said outer lid having a plurality of apertures registering with the apertures of the inner lid in one position to which the outer lid is rotated, and disposed out of registration with the inner lid apertures to close the several apertures of both lids, in a second position to which the outer lid is rotated, said means having a separable connection to the inner lid.

2. A holder for deodorants and like substances comprising a receptacle, means therein for supporting a deodorizing or like substance, an inner lid having a plurality of apertures, said inner lid being removably supported on said receptacle, and an outer lid rotatably supported upon said receptacle and overlying said inner lid, said outer lid having a plurality of apertures registering with the apertures of the inner lid in one position to which the outer lid is rotated, and disposed out of registration with the inner lid apertures to close the several apertures of both lids, in a second position to which the outer lid is rotated, said means having a separable connection to the inner lid, and to the receptacle, to normally prevent removal of the inner lid from its position upon the receptacle.

3. A holder for deodorants and like substances comprising a receptacle, means therein for supporting a deodorizing or like substance, an inner lid having a plurality of apertures, said inner lid being removably supported on said receptacle, and an outer lid rotatably supported upon said receptacle and overlying said inner lid, said outer lid having a plurality of apertures registering with the apertures of the inner lid in one position to which the outer lid is rotated, and disposed out of registration with the inner lid apertures to close the several apertures of both lids, in a second position to which the outer lid is rotated, said means having a separable connection to the inner lid, and to the receptacle, to normally prevent removal of the inner lid from its position upon the receptacle, the receptacle being formed with a plurality of recesses spaced circumferentially thereof, said inner lid including correspondingly spaced lugs depending from the periphery thereof and engaging in said recesses to prevent rotation of the inner lid in said position thereof.

4. A holder for deodorants and like substances comprising a receptacle, means therein for supporting a deodorizing or like substance, an inner lid having a plurality of apertures, said inner lid being removably supported on said receptacle, and an outer lid rotatably supported upon said receptacle and overlying said inner lid, said outer lid having a plurality of apertures registering with the apertures of the inner lid in one position to which the outer lid is rotated, and disposed out of registration with the inner lid apertures to close the several apertures of both lids, in a second position to which the outer lid is rotated, said means having a separable connection to the inner lid, and to the receptacle, to normally prevent removal of the inner lid from its position upon the receptacle, the receptacle being formed with a plurality of recesses spaced circumferentially thereof, said inner lid including correspondingly spaced lugs depending from the periphery thereof and engaging in said recesses to prevent rotation of the inner lid in said position thereof, said separable connection comprising a suction cup connectable to said receptacle and including an upstanding threaded stud, an internally threaded sleeve engaged at one end with said stud, and a screw depending from the inner lid and engaging in the other end of the sleeve.

5. A holder for deodorants and like substances comprising a receptacle, means therein for supporting a deodorizing or like substance, an inner lid having a plurality of apertures, said inner lid being removably supported on said receptacle, and an outer lid rotatably supported upon said receptacle and overlying said inner lid, said outer lid having a plurality of apertures registering with the apertures of the inner lid in one position to which the outer lid is rotated, and disposed out of registration with the inner lid apertures to close the several apertures of both lids, in a second position to which the outer lid is rotated, said means comprising a rubber suction cup connectable to said receptacle, a threaded stud extending upwardly therefrom, said cup adapted to provide a bottom support for said substance, an upstanding sleeve engaging said stud and including a flange at its upper end adapted to engage against said substance for clamping the same between said cup and flange, a spacer sleeve supported on the upstanding sleeve, and a screw depending from the inner lid and extending through the spacer sleeve in engagement with the first-named sleeve.

6. A holder for deodorants and like substances comprising a receptacle, means therein for supporting a deodorizing or like substance, an inner lid having a plurality of apertures, said inner lid being removably supported on said receptacle, and an outer lid rotatably supported upon said receptacle and overlying said inner lid, said outer lid having a plurality of apertures registering with the apertures of the inner lid in one position to which the outer lid is rotated, and disposed out of registration with the inner lid apertures to close the several apertures of both lids, in a second position to which the outer lid is rotated, said means comprising a cup for holding a quantity of a liquid deodorant or like substance, a threaded sleeve integrally formed on said cup at the center thereof and projecting upwardly into engagement with the inner lid, and a screw depending from the inner lid and engaged in said sleeve.

7. A holder for deodorants and like substances comprising a receptacle, means therein for supporting a deodorizing or like substance, an inner lid having a plurality of apertures, said inner lid being removably supported on said receptacle, and an outer lid rotatably supported upon said receptacle and overlying said inner lid, said outer lid having a plurality of apertures registering with the apertures of the inner lid in one position to which the outer lid is rotated, and disposed out of registration with the inner lid apertures to close the several apertures of both lids, in a second position to which the outer lid is rotated, said means having a separable connection to the inner lid, and to the receptacle, to normally prevent removal of the inner lid from its position upon the receptacle, a plurality of metal sleeve elements spaced circumferentially of the receptacle, said inner lid including correspondingly spaced tongues depending from the periphery thereof and engaging in said sleeve elements to prevent rotation of the inner lid in said position thereof.

8. A holder for deodorants and like substances comprising a receptacle, means therein for supporting a deodorizing or like substance, an inner lid having a plurality of apertures, said inner lid being removably supported on said receptacle, and an outer lid rotatably supported upon said receptacle and overlying said inner lid, said outer lid having a plurality of apertures registering with the apertures of the inner lid in one position to which the outer lid is rotated, and disposed out of registration with the inner lid apertures to close the several apertures of both lids, in a second position to which the outer lid is rotated, said means having a separable connection to the inner lid, said receptacle being open at the top with the inner lid seating on said open top.

9. A holder for deodorants and like substances comprising a receptacle, means therein for supporting a deodorizing or like substance, an inner lid having a plurality of apertures, said inner lid being removably supported on said receptacle, and an outer lid rotatably supported upon said receptacle and overlying said inner lid, said outer lid having a plurality of apertures registering with the apertures of the inner lid in one position to which the outer lid is rotated, and disposed out of registration with the inner lid apertures to close the several apertures of both lids, in a second position to which the outer lid is rotated, said means having a separable connection to the inner lid, said receptacle being open at the top with the inner lid seating on said open top, said separable connection extending axially of the receptacle between the inner lid and the bottom of the receptacle.

10. A holder for deodorants and like substances comprising a receptacle, means therein for supporting a deodorizing or like substance, an inner lid having a plurality of apertures, said inner lid being removably supported on said receptacle, and an outer lid rotatably supported upon said receptacle and overlying said inner lid, said outer lid having a plurality of apertures registering with the apertures of the inner lid in one position to which the outer lid is rotated, and disposed out of registration with the inner lid apertures to close the several apertures of both lids, in a second postion to which the outer lid is rotated, said means having a separable connection to the inner lid, said receptacle being open at the top with the inner lid seating on said open top, said separable connection extending axially of the receptacle between the inner lid and the bottom of the receptacle, said means being disposed in spaced relation to the inner lid and the receptacle bottom.

11. In a deodorizer, a cup-shaped casing having a series of openings spaced circumferentially therearound adjacent its upper open end, a suction cup applied to the bottom of said casing on the inside thereof, a deodorant substance supported on the top of said suction cup, and a removable cover for the casing, said cover having a depending flange with a series of openings spaced circumferentially thereof for registration with the openings in said casing.

References Cited in the file of this patent
UNITED STATES PATENTS

| | | |
|---|---|---|
| 1,732,028 | Reiner | Oct. 15, 1929 |
| 2,500,896 | Drake | Mar. 14, 1950 |
| 2,613,990 | Lustek | Oct. 14, 1952 |